United States Patent
Wöhrle

(10) Patent No.: US 7,723,898 B2
(45) Date of Patent: May 25, 2010

(54) DEVICE FOR THE VIBRATIONAL DETECTION OF FILL-LEVEL LIMIT STATE AND A PROCESS FOR THE VIBRATIONAL DETECTION OF A FILL-LEVEL LIMIT STATE

(75) Inventor: Siegbert Wöhrle, Schiltach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 11/496,584

(22) Filed: Aug. 1, 2006

(65) Prior Publication Data

US 2007/0029897 A1 Feb. 8, 2007

Related U.S. Application Data

(60) Provisional application No. 60/720,471, filed on Sep. 27, 2005.

(30) Foreign Application Priority Data

Aug. 2, 2005 (DE) ........................ 10 2005 036 872

(51) Int. Cl.
*H01L 41/113* (2006.01)
(52) U.S. Cl. .................... 310/314; 310/316.01; 310/318
(58) Field of Classification Search ............ 310/316.01, 310/318
See application file for complete search history.

(56) References Cited

U.S. PATENT DOCUMENTS

| | | | | |
|---|---|---|---|---|
| 5,712,598 | A * | 1/1998 | Tomikawa ................... | 331/105 |
| 6,429,571 | B2 * | 8/2002 | Raffalt et al. .......... | 310/316.01 |
| 7,146,845 | B2 * | 12/2006 | Raffalt ........................ | 73/1.83 |
| 2003/0090297 | A1 * | 5/2003 | Sato et al. ..................... | 327/36 |
| 2004/0104734 | A1 * | 6/2004 | Jafarian-Tehrani et al. .. | 324/658 |
| 2005/0093302 | A1 * | 5/2005 | Miyazaki et al. ............ | 290/1 R |
| 2005/0184627 | A1 * | 8/2005 | Sano et al. ................... | 310/363 |

FOREIGN PATENT DOCUMENTS

| | | |
|---|---|---|
| DE | 195 48 041 | 7/1996 |
| DE | 195 48 041 C2 | 7/1996 |
| DE | 103 31 428 A1 | 2/2005 |
| GB | 1095436 | 12/1967 |
| WO | 2004/055485 | 7/2004 |

* cited by examiner

*Primary Examiner*—Walter Benson
*Assistant Examiner*—Bryan P Gordon
(74) *Attorney, Agent, or Firm*—Jerald L. Meyer; Derek Richmond; Stanley N. Protigal

(57) ABSTRACT

A device for the vibrational detection of a fill-level limit state and a process for the vibrational detection of a fill-level limit state The invention relates to a device for the vibrational detection of a fill-level limit state, and to a corresponding process, with
  a vibrational resonator (10),
  at least one piezoelement (11) that is loaded with a piezo-capacitance in order to induce a vibration in the vibrating resonator (10) by providing a drive frequency, and in order to detect a vibration in the vibrating resonator (10);
  two connecting conductors (12, 13) for the piezoelement (11), and
  circuit components (18-20) for evaluating a vibration in the vibrating resonator (10) detected by the piezoelement (11),
  where a branch with a compensating capacitor (2) is connected in parallel to a branch exhibiting the piezoelement (11) in order to compensate a recharging current in the piezoelement (11), which recharging current is dependent on the piezo-capacitance.

18 Claims, 6 Drawing Sheets

DEVICE FOR THE VIBRATIONAL DETECTION OF FILL-LEVEL LIMIT STATE AND A PROCESS FOR THE VIBRATIONAL DETECTION OF A FILL-LEVEL LIMIT STATE

This application claims benefit of U.S. Provisional Patent Application 60/720,471 filed Sep. 27, 2005 and claims priority to German patent application 10 2005 036 872.7 filed Aug. 2, 2005, the contents of which are hereby incorporated by reference in their entirety.

DESCRIPTION

Figure 6:
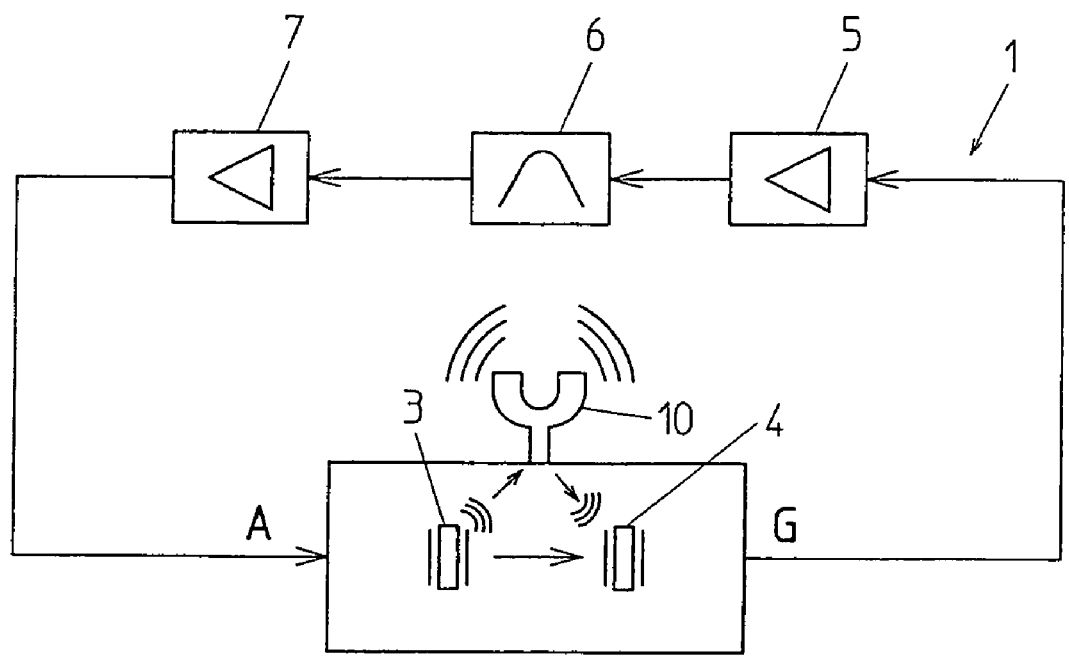

A device for the vibrational detection of a fill-level limit state and a process for the Vibrational detection of a fill-level limit state Vibrational fill-level limit state switches 1, which are employed as devices for detecting liquids, are vibrational resonators, customarily forked oscillators with piezoelectric drive systems, as sketched out in FIG. 6. They usually contain a transmitting piezoelement 3 that induces vibration in a mechanical oscillating element that takes the form of a fork 10, and also contain a second, receiving piezeoelement 4, which detects an oscillation in the fork 10. By means of a circuit, which customarily exhibits an amplifier 5, a filter 6, and a comparator 7, the detected signal is so amplified and the phase position of the signal so shifted that the vibratory condition for the system is fulfilled.

DE 196 21 449 C2 describes a vibratory fill-level limit switch with a vibrating resonator. Only one piezoelement is used to drive and detect the vibrating resonator, and the piezoelement is connected by means of a two-wire line. In this arrangement the vibration is induced and detected by this single piezoelement. For this to happen, a voltage arising from a recharging piezo-current must be blanked. At a temperature of 280° C. relative to room temperature the piezo-capacitance rises by a factor of three. A disadvantage of this process, therefore, is that in the case of high recharging capacitances, such as those caused by high temperatures or long lines, the blanking interval is so long that the process cannot be used, or can only be used in a very restricted fashion.

The goal of the invention is to create a device, or the circuit of a device, which also operates with only one piezoelement and a two-wire line, but which, in contrast to the prior process, functions independently of both the piezo-capacitance and the line capacitance.

This problem is solved by the device exhibiting the features of patent claim 1 and by the process exhibiting the features of patent claim 9.

Preferred therefore is a device for the vibrational detection of a fill-level limit state, with a vibrational resonator; with a piezoelement that is charged with a piezo-capacitance in order to induce a vibration in the vibrating resonator by applying a drive frequency, and in order to detect the vibration in the vibrating resonator; with two connecting lines for the piezoelement; and with circuit components for evaluating a vibration in the vibrating resonator as detected by the piezo-element, such that a branch exhibiting a compensating capacitor is connected in parallel to a branch exhibiting the piezoelement, in order to compensate a recharging current of piezoelement that is dependent on the piezo-capacitance.

The preferred process is a process for the vibrational detection of a fill-level limit state, in which a piezoelement loaded with a piezocapacitance induces a vibration in a vibrating resonator by providing a drive frequency and detects a vibration in the vibrating resonator, such that a recharging current belonging to the piezoelement and dependent on the piezo-capacitance is compensated by means of a branch that exhibits a piezo-capacitance and is connected in parallel to the branch exhibiting the piezoelement.

The problem of the invention is thus solved particularly in that the recharging current, which is dependent on the piezo-capacitance and the line capacitance, is compensated, specifically is compensated completely.

Advantageous elaborations are the subject matter of dependent claims.

Particularly preferred in a device in which the compensating capacitor is designed to compensate the recharging current, which is dependent on the piezo-capacitance and, additionally, on a line capacitance of the piezoelement.

Particularly preferred is a device in which an inverter applies to the compensating capacitor a signal which is derived from a drive voltage for the piezoelement.

Particularly preferred is a device in which a capacitance of exactly, or almost exactly, the same magnitude as a piezo-capacitance, or a piezo- and line capacitance, is applied as a compensating capacitance.

Particularly preferred is a device in which a tap is positioned between the piezoelement and the compensating capacitor in order to tap a compensated signal which contains only a portion of the mechanical vibration of the vibrating resonator.

Particularly preferred is a device in which the compensating capacitor, or the electronic circuit simulating the compensating capacitor, has a control input for adjusting the capacitance.

Particularly preferred is a device with a compensating control unit. The compensating control is executed by a compensating capacitor, or by an electronic circuit that simulates the compensating capacitor, to which a controlled is voltage is to be applied.

Particularly preferred is a device in which a synchronous rectifier provides in controlled fashion an input signal for the compensating control unit, as dependent on the signal or voltage of a point directly between the piezoelement and the compensating capacitor, and in which a frequency divider for dividing the drive frequency provides a control signal for the synchronous rectifier.

Particularly preferred is a process, in which a line capacitance belonging to the piezoelement is compensated in addition to the piezo-capacitance.

Particularly preferred is a process in which an inverted signal, which is derived from the drive voltage for the piezo-element, is applied to the compensating capacitor with the compensating capacitance.

Particularly preferred is a process in which a compensating capacitance of exactly, or almost exactly, the same magnitude as the piezo-capacitance, or a piezo- and line capacitance, is applied in the form of a compensating capacitor.

Particularly preferred is a process in which a compensated signal is tapped between the piezoelement and the compensating capacitor with the compensating capacitance, which signal retains only a portion of the mechanical vibration of the vibrating resonator.

Particularly preferred is a process in which a capacitance belonging to the compensating capacitor, or to an electronic circuit simulating the compensating capacitor, can be variably adjusted and controlled.

Particularly preferred is a process in which a controlled voltage is applied to a compensating capacitor or to its simulation.

Particularly preferred is a process in which an input signal for the compensating control unit is provided in controlled fashion by a synchronous rectifier, as dependent on the signal or voltage of a point directly between the piezoelement and the compensating capacitor, and in which a control signal for the synchronous rectifier is provided by a frequency divider for dividing the drive frequency.

Figure 1:
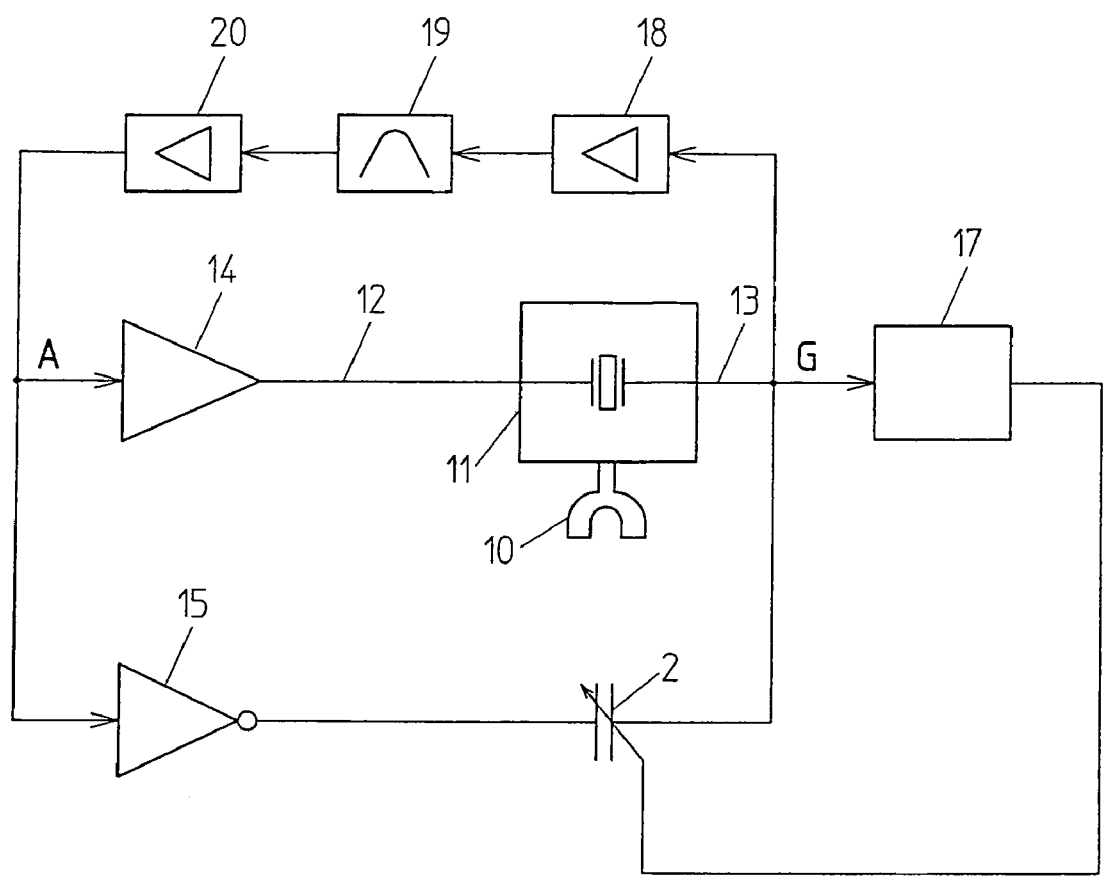
Figure 2:
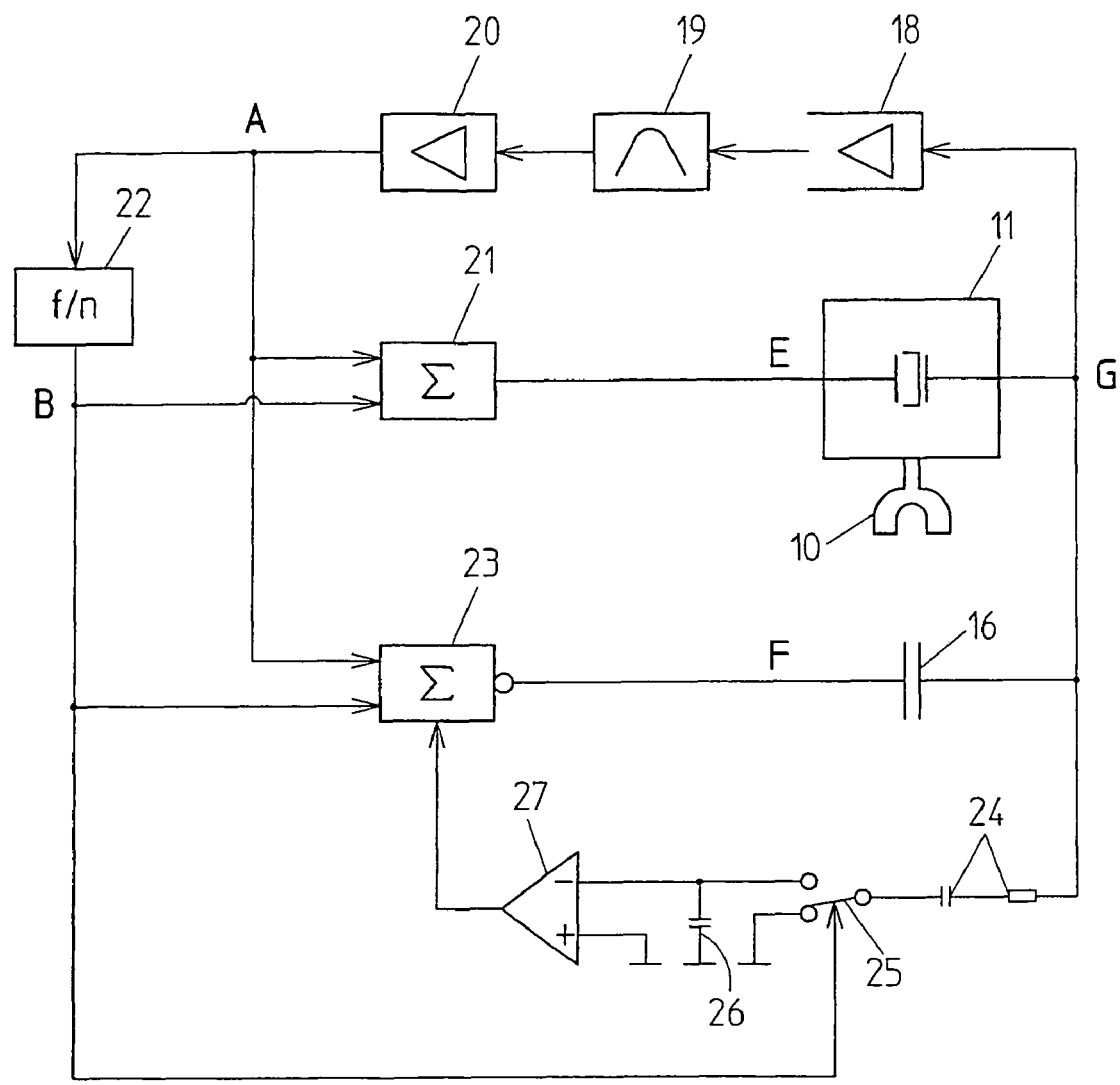
Figure 3:
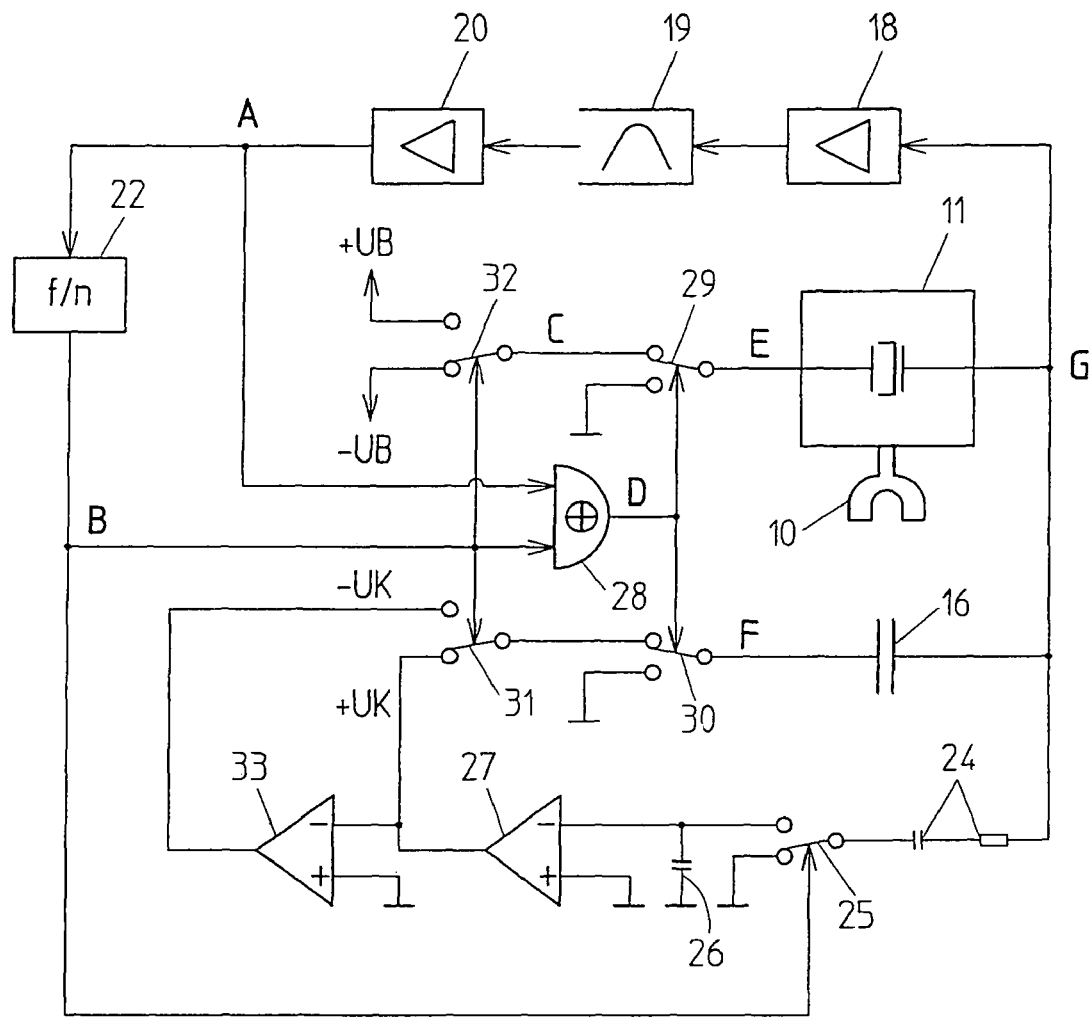
Figure 4:
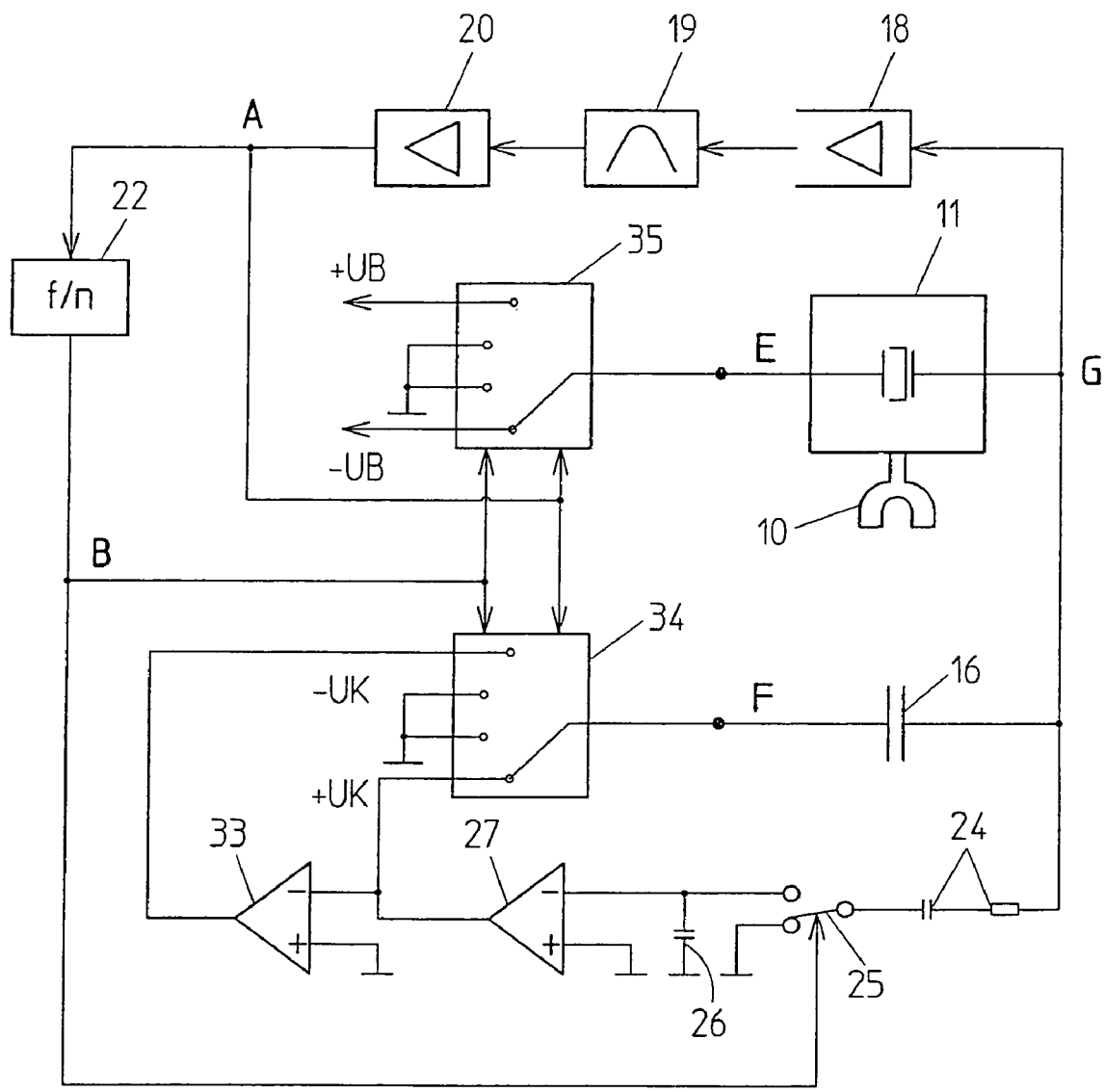
Figure 5:
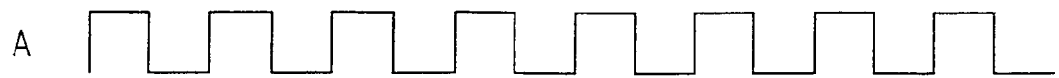
Figure 5:
Figure 5:
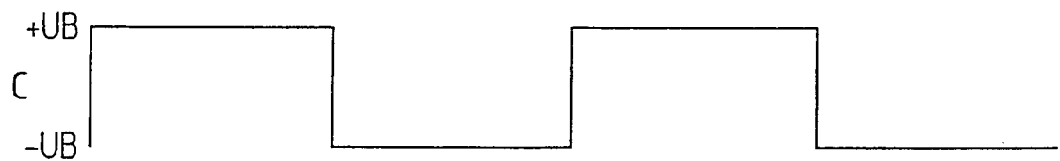
Figure 5:
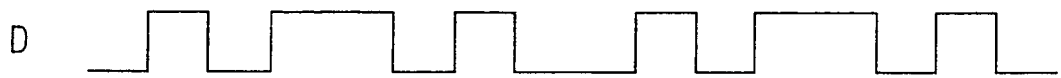
Figure 5:
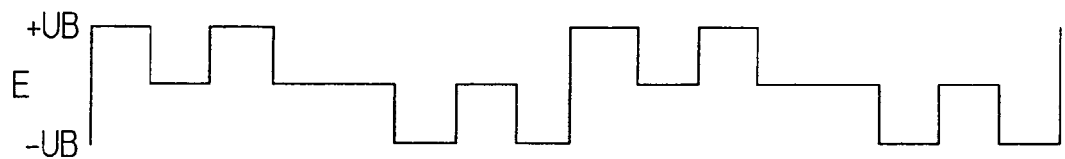
Figure 5:
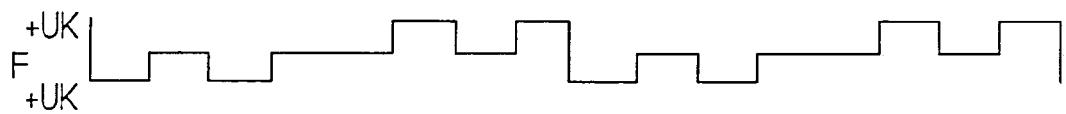
Figure 5:
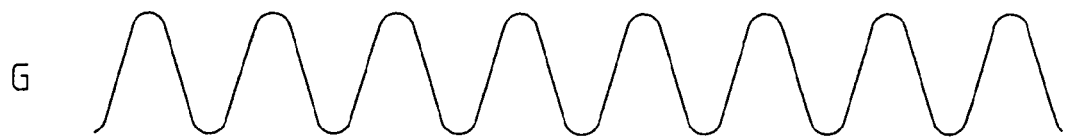

An exemplary embodiment will next be described in detail on the basis of the drawing. Shown are:

FIG. 1 a schematic depiction of a vibrational fill-level limit switch, with circuit components for its control FIG. 2 a preferred circuit arrangement with a vibrational fill-level limit switch FIG. 3 a preferred practical circuit arrangement with a vibrational fill-level limit switch FIG. 4 another preferred practical circuit arrangement with a vibrational fill-level limit switch FIG. 5 signal sequences for different tapping points in such a circuit FIG. 6 a known vibrational limit-state switch.

FIG. 1 schematically depicts a vibrational fill-level limit switch 1, with circuit components for controlling said switch 1 as a device for vibrationally detecting the limit state of liquids. At least one piezoelement 11 is employed to drive, or set into vibration, a vibrational resonator 10 and to detect a vibration in the vibrational resonator 10. This piezoelement 11 is connected to components of the circuit by a two-wire line 12. The mechanical vibration of the vibrating resonator 10 can be directly tapped by compensating a piezo-recharging current belonging to the piezoelement 11.

FIG. 2 depicts only the principle functional elements of a process for the control and utilization of this kind of device. The piezoelement 11 is connected to a buffer 14 by the first line 12 of the piezoelement. The input of the buffer 14 connects with an initial nodal point A. The second line 13 leads from the piezoelement 11 to a second nodal point G. In an arrangement connected in parallel thereto, an inverter 15 and a capacitive device 2 providing a compensating capacitance are connected between the first nodal point A and the second nodal point G to provide a compensating capacitance. The compensating capacitance here in principle takes the form of an adjustable capacitor, which exhibits a control input to adjust its effective capacitance. The second nodal point G is thus connected between the piezo-capacitance and—as the case may be—the line capacitance, on one side, and the compensating capacitance of the compensating capacitor 2, on the other side. Connected to the second nodal point G is a measuring device 17, which is installed in order to determine the piezo-capacitance. A line runs from the measuring device 17 to the control input of the compensating capacitor 2, in order to control said compensating capacitor 2. In addition, an arrangement consisting of an amplifier 18, a filter 19, and a comparator 20 is connected in series between the second nodal point G, which represents an output of the piezoelement 11, and the first nodal point A, which represents an input of the piezoelement 11.

The piezo- and line capacitance is compensated through the branch that is parallel to the branch containing the piezoelement, such that the control signal is inverted at the first nodal point A into a compensating capacitance which as nearly as possible equals the magnitude of the piezo- and line capacitance. At the second point G, between the piezo-capacitance and the compensating capacitance, a compensated signal can then be tapped which contains only a portion of the mechanical vibration in the form of a sinusoidal vibration. The voltage that arises from recharging the piezoelement 11 is thus compensated. There is a difficulty in measuring the piezo-capacitance without interrupting the vibration of the vibrating resonator 10 in the process. In addition, the compensating capacitance must be tracked as precisely as possible. In the process, the adjustable compensating capacitance 2 must be replaced by a simulative electronic circuit.

The circuit shown in FIG. 2 offers a solution to this set of problems. For the sake of simplicity, the following describes only components which have been added to the circuit shown in FIG. 1 or which have been modified from it.

Connected between the first point A and the piezoelement 11 is an initial adder 21, whose output forms a fourth point E. In addition, a frequency divider 22 is connected between the first point A and another input belonging to the first adder 21. The output of the frequency divider 22 forms a third point B to which, additionally, an input belonging to a second adder 23 is connected. The first nodal point A connects with a second input of the second adder 23. The second adder 23 has a control input. An inverted output of the second adder 23 is applied to the input of the compensating capacitor 16. The output of the second adder 23 forms a fifth point F.

Connected to the second point G by a non-inductive device and another capacitive device 24 is a switching facility 25, which as a synchronous equalizer applies the signal of the second point G selectively to a ground connection or to a negative input of the compensating voltage control unit 27. In addition, the negative input of the compensating voltage control unit 27 is connected to the ground connection, or to a base voltage, by another capacitive device 26. The positive input of the compensating voltage control unit 27 is also applied to the ground connection. An output of the compensating voltage control unit 27 is applied as a control signal to the second adder 23. A signal of the third point B connects with a switching input of the switching circuit 25.

By frequency division f/n, there is produced from the drive voltage of the first point A a second voltage as a capacitance measuring voltage at the third point B. For example, a divider ratio of one fourth the frequency f/4 is selected. The capacitance measuring voltage at the third point B is superimposed through the addition of the drive voltage at the first point A, so that there is a superimposed voltage at the fourth point E. In the same fashion an inverted voltage is produced in a second branch, at the fifth point F. This voltage is can be adjusted in amplitude, allowing an adjustable compensating capacitance to be reproduced. The compensating capacitor 16 otherwise remains constant; in the process, the charge amount which the compensating capacitor 16 is able to store is modified by the voltage level. The piezoelement 11 and the series-connected compensating capacitor are controlled with the two voltages, the superimposed voltage and the superimposed inverted voltage at the fourth and fifth point E and F. In the case of exact compensation of the recharging currents, the recharging voltages compensate themselves at the second point G between the two capacitances. Thus at this point there arises only the mechanical resonance vibration of the vibrating resonator 10. The frequency of the capacitance measuring voltage at the third point B lies outside the mechanical resonance of the vibrating resonator 10. This capacitance measurement at the third point B allows the piezo-capacitance to be compared with the compensating capacitance. When the compensation is exact, the voltage is zero for this frequency at the second point G between the capacitances. In the case of incorrect compensation there is a fault voltage at this second point G.

This fault voltage can be evaluated with the aid of the synchronous equalizer, which is formed by the switching device 25 acting as a measuring device. Since the mechanical resonance vibration of the vibrational resonator 10 is a multiple of the capacitance measuring voltage B with which the synchronous rectifier is controlled, a voltage is obtained after rectification which is dependent only on the piezo- and compensating capacitance. By means of a control loop the level of a compensating voltage UK with which the compensating capacitor 16 is guided is modified at the voltage output with the inverted voltage, i.e., at the fifth point F, in such a way that the recharging voltage remains zero at the second point G between these capacitances. In this way, the piezo-capacitances can be modified up to the level of the compensating capacitor 16, for which reason the compensating capacitor 16 must be so selected as to provide sufficient size. Since the compensating capacitor 16 itself is not modified, the control voltage is a direct measure of the size of the piezo-capacitance.

FIG. 3 shows a practical embodiment, with signal curves at different points in the circuit during execution of the preferred process. The first point A with the drive voltage and the output of the frequency divider 22, i.e., the third point B, are connected to inputs of an EXOR gate 28 (EXOR: exclusive-or). Its output forms a sixth point D, which applies a switching signal to a second and third switching device 29, 30. In addition, the signal at the third point B is applied to the synchronous rectifier 25 as a switching signal. This and other components are connected between the second point G and the compensating voltage control unit 27, as in FIG. 2.

The output of the compensating voltage control unit 27 is applied as a positive compensating voltage +UK to a switching input of a fourth switching device 31. The output of the compensating voltage control unit 27 is also applied to a negative input of a compensating voltage inverter 33, whose second negative input connects with the ground connection. As negative compensating voltage −UK, the output of the compensating voltage inverter 33 connects with the fourth switching device 31. The switched output of the fourth switching device 31 connects with the first switching input of the third switching device 30. The output of the third switching device 30 connects with the fifth nodal point F, which forms the input for the compensating capacitor 16. This, in turn, is connected to the piezoelement 11 by the second point G.

The input of the piezoelement 11 forms the fourth point E, which connects with the output of the second switching device 29. The first input of the second switching device 29 is consequently switched like the switching input of the third switching device 30, which connects with the fourth switching device 31. The two other switching inputs of the second and third switching device 29, 30 connect with the ground connection. The first switching input of the second switching device 29 forms a seventh point C and connects with an output of a fifth switching device 32. The latter's switching inputs connect with a positive or, as the case may be negative operating voltage +UB, −UB. The signal of the third point B connects with switching connections of the fourth and the fifth switching devices 31, 32.

The voltages at the fourth point E and the fifth point F are produced in corresponding fashion by the second to fifth switching device 29-32 acting as switches and by the EXOR gate 28. FIG. 4 shows another useful embodiment of the circuit configuration. The following describes only the components and functions that differ from those of the embodiment shown in FIG. 3. In place of the EXOR gate 28 and the switching devices 29-32 shown in FIG. 3, a first and second multiplexer 34, 35 are installed in the circuit. The signal shapes at the fourth point E and at the fifth point F are thus produced by analogue multiplex components.

The first point A with the drive voltage is connected to a switching input of the first multiplexer 34 and to a switching input of the second multiplexer 35. In addition, the third point B, with the signal of the frequency divider 22, is connected to another switching input of the first multiplexer 34 and to another switching input of the second multiplexer 35.

The output of the compensating voltage control unit 27 is applied as positive compensating voltage +UK to a signal input of the first multiplexer 34. The output of the compensating voltage control unit 27 is also applied to a negative input of the compensating voltage inverter 33, whose second negative input connects with the ground connection. The output of the compensating voltage inverter 33, as negative compensating voltage −UK, connects with another signal input of the first multiplexer 34. Two other signal inputs of the first multiplexer 34 connect with the ground connection. The switched output of the first multiplexer 34 connects with the fifth point F, which forms the input for the compensating capacitor 16. This is turn is connected to the piezoelement by the second point G.

The input of the piezoelement 11 again forms the fourth point E, which in this embodiment connects with the output of the second multiplexer 35. A first and a fourth signal input of the second multiplexer 35 connect with a positive and a negative operating voltage +UB, −UB. A second and a third signal input of the second multiplexer 35 connect with the ground connection.

Another advantages are created by the ability to very precisely measure the piezo-capacitance. It is thereby possible to detect with certainty a line break and a short-circuit in the lines to the vibrational sensor. Moreover, a change in the piezo-capacitance may indicate damage to the piezoelement 11.

FIG. 5 depicts voltage and signal curves in relation to each other at the different points, in a temporal sequence presented by way of example. A simple clocked signal serving as the drive voltage connects with an initial point A. In normal operation the frequency of this signal corresponds to that of the mechanical resonance oscillation of the vibrating resonator. At the frequency-divided third point B there is a cycle which has a period with a duration equal to four periods of the drive signal at point A. At the seventh point C there is a voltage switched in timed fashion that is equal to the operating voltage +UB, −UB, where the cycle corresponds to that of the signal at the third point B. At the sixth point D there is a signal switched in timed fashion that is obtained from the signals A and B of FIG. 5 by an EXOR linkage. Signal curves at the fourth and fifth point E, F run in inverted fashion one to the other and depend on the magnitude of the operating voltage +UB, −UB and on the compensating voltage −UK, +UK. These signals alternate the timed state in parallel with the state of the signal at the sixth point D and also the end of a period of the signal at the third point B. At the second point G there is a sinusoidal output signal belonging to the piezoelement 11, which forms a compensating measuring signal of the piezoelement 11 and corresponds to the resonance oscillation of the vibrating resonator.

Other embodiments can be realized as alternatives.

To cover a larger compensating range it is possible, for example, to switch between different compensating capacitors using an analogue switch and to perform only the fine adjustment by modifying the compensating voltage. An advantage afforded by this process rests in the fact that the maximum voltage is always available for operation. Compensating small piezo-capacitances with a large compensating capacitor results is a smaller recharging voltage due to the small compensating voltage.

By way of example, it is also possible to produce the capacitance measuring voltage, not by dividing the frequency of the drive voltage, but by feeding in a fixed frequency, coming, e.g., from a microprocessor. To be sure, in this variant the vibration on the mechanical resonance should be interrupted for the time of the capacitance measurement, since otherwise beats of very low frequencies might arise. An interruption in the mechanical vibration would increase the reaction time of the device.

LIST OF REFERENCE NUMERALS 1 vibrational fill-level limit switch
2 adjustable compensating capacitance
3 transmitting piezoelement
4 receiving piezoelement
5 amplifier
6 filter
7 comparator
10 vibrating resonator
11 piezoelement
12 first conductor to 11
13 second conductor to 11
14 buffer
15 inverter
16 capacitor of simulation
17 measuring device
18 amplifier
19 filter
20 comparator
21 first adder
22 frequency divider
23 adder of simulation
24 non-inductive and capacitive device
25 synchronous rectifier/first switching device
26 capacitive device
27 compensating voltage control unit
28 EXOR gate
29-32 $2^{nd}$ to $5^{th}$ switching device
33 compensating voltage inverter
34, 35 $1^{st}$ and $2^{nd}$ multiplexer
A first point/drive voltage
B third point/capacitance measuring voltage
C $7^{th}$ point
D $6^{th}$ point
E $4^{th}$ point
F $5^{th}$ point/inverted or compensating voltage
G $2^{nd}$ point/compensated signal

The invention claimed is:
1. A device for the vibrational detection of a fill-level limit state, the device comprising:
   a vibrational resonator;
   at least one piezoelement that is loaded with a piezo-capacitance in order to induce a vibration in the vibrating resonator by providing a drive frequency, and in order to detect a vibration in the vibrating resonator;
   first and second connecting conductors for the piezoelement;
   circuit components for evaluating a vibration in the vibrating resonator detected by the piezoelement;
   a frequency divider circuit receiving an output voltage from the circuit components for evaluating the vibration detected by the piezoelement and providing a capacitance measuring voltage;
   a circuit capable of superimposing the output voltage from the circuit components for evaluating the vibration detected by the piezoelement with the capacitance measuring voltage;
   an inverter providing an output corresponding to an inverted voltage obtained by superimposing the output voltage from the circuit components for evaluating the vibration detected by the piezoelement with the capacitance measuring voltage; and
   a synchronous rectifier controlled by the capacitance measuring voltage and providing a control signal for amplitude adjustment, wherein
   a branch with a compensating capacitor is connected in parallel to a branch with the piezoelement in order to compensate a recharging current belonging to the piezoelement and dependent on the piezo-capacitance,
   a first lead of the compensating capacitor is connected to the piezoelement via the second connecting conductor for the piezoelement,
   a second lead of the compensating capacitor is connected to the inverter,
   the inverter supplies the second lead of the compensating capacitor with a signal which is inverted with respect to a signal on the first connecting conductor for the piezoelement, and
   the synchronous rectifier provides evaluation of a fault voltage by rectifying, at a frequency corresponding to an output of the frequency divider circuit, a signal corresponding to an output of the piezoelement to cause a voltage after rectification to depend on capacitance of the piezoelement and capacitance of the compensating capacitor.

2. A device according to claim 1, in which the compensating capacitor, or its simulation, is designed to compensate the recharging current, which is dependent on the piezo-capacitance and, additionally, on a line capacitance of the piezoelement.

3. A device according to claim 1, wherein a compensating capacitance of exactly, or almost exactly, the same magnitude as the piezo-capacitance, or the sum of the piezo- and line capacitance, is applied in the form of a compensating capacitor.

4. A device according to claim 1, wherein a tap is positioned between the piezoelement and the compensating capacitor in order to tap a compensated signal which retains only a portion of the mechanical vibration of the vibrating resonator.

5. device according to claim 1, wherein the compensating capacitor, or its simulation, has a control input for adjusting the capacitance of said capacitor.

6. A device according to claim 1, wherein a compensating control unit is connected in order to apply a controlled voltage to the compensating capacitor or to its simulation.

7. A device according to claim 6, wherein
   the synchronous rectifier provides in controlled fashion an input signal for the compensating control unit as dependent on the signal or voltage of a point directly between the piezoelement and the compensating capacitor,
   the frequency divider provides a control signal for the synchronous rectifier.

8. A process for the vibrational detection of a fill-level limit state, wherein
   at least one piezoelement charged with a piezo-capacitance induces a vibration in a vibrating resonator by providing a drive frequency and detects a vibration in the vibrating resonator, wherein a recharging current in the piezoelement, which current is dependent on the piezo-capacitance, is compensated by a branch which has a compensating capacitance and which is connected in parallel to the branch with the piezoelement, wherein an inverted signal which is derived from the drive voltage for the piezoelement is applied to a compensating capacitor with the compensating capacitance, and wherein a synchronous rectifier controlled by a signal received from the compensating capacitance provides a control signal for amplitude adjustment and provides evaluation of a fault voltage by rectifying, at a frequency corresponding to an output of the frequency divider circuit, a signal corresponding to an output of the piezoelement to cause a voltage after rectification to depend on capacitance of the piezoelement and capacitance of the compensating capacitor.

9. A process according to claim 8, wherein a line capacitance belonging to the piezoelement is compensated, in addition to the piezo-capacitance.

10. A process according to claim 8, wherein the compensating capacitance is applied in the form of the compensating capacitor and is of exactly, or almost exactly, the same magnitude as the piezo-capacitance, or a piezo- and line capacitance.

11. A process according to claim 8, wherein a compensated signal is tapped between the piezoelement and the compensating capacitor with the compensating capacitance, which signal retains only a portion of the mechanical vibration of the vibrating resonator.

12. A process according to claim 8, wherein the compensating capacitance belonging to the compensating capacitor or its simulation can be variably adjusted and controlled.

13. A process according to claim 8, wherein a controlled voltage is applied to the compensating capacitor or to its simulation.

14. A process according to claim 8, wherein
an input signal for the compensating control unit is provided in controlled fashion by a synchronous rectifier, as dependent on the signal or voltage of a point directly between the piezoelement and the compensating capacitor, and a control signal for the synchronous rectifier is provided by a frequency divider for dividing the drive frequency.

15. A device according to claim 1, the device further comprising:
a measuring device connected to the second connecting conductor and the first lead of the compensating capacitor, wherein the measuring device determines the piezo-capacitance via the second connecting conductor, wherein the measuring device provides an input signal to a control input of the compensating capacitor via the first lead, and wherein the input signal is varied according to variations in the piezo-capacitance measured by the measuring device.

16. A device according to claim 1, wherein
the compensating capacitance as nearly as possible equals the magnitude of the piezo-capacitance.

17. A process according to claim 8,
wherein a measuring device determines the piezo-capacitance and provides an input signal to a control input of the compensating capacitor which is varied according to variations in the piezo-capacitance measured by the measuring device.

18. A process according to claim 8, wherein
the compensating capacitance as nearly as possible equals the magnitude of the piezo-capacitance.

* * * * *